United States Patent
Kanzaki

[11] Patent Number: 5,704,030
[45] Date of Patent: Dec. 30, 1997

[54] METHOD FOR COMPENSATING TIME IN TRANSMITTING UNIT AND TRANSMITTING SYSTEM

[75] Inventor: Tomoyuki Kanzaki, Kawasaki, Japan

[73] Assignee: Fujitsu Limited, Kanagawa, Japan

[21] Appl. No.: 516,109

[22] Filed: Aug. 17, 1995

[30] Foreign Application Priority Data

Aug. 18, 1994 [JP] Japan .................. 6-193463

[51] Int. Cl.$^6$ ............................................. G06F 1/14
[52] U.S. Cl. ...................... 395/182.1; 395/200.19; 395/553; 395/557
[58] Field of Search .................. 375/35.4, 355, 375/356; 340/825.06, 825.14; 395/182.1, 200.19, 551, 553, 557, 558, 559; 364/145

[56] References Cited

U.S. PATENT DOCUMENTS

| | | | |
|---|---|---|---|
| 4,531,185 | 7/1985 | Halpern et al. ................... | 364/200 |
| 4,815,110 | 3/1989 | Benson et al. ................... | 375/107 |
| 5,504,878 | 4/1996 | Coscarella et al. .............. | 395/550 |

*Primary Examiner*—Dennis M. Butler
*Attorney, Agent, or Firm*—Helfgott & Karas, P.C.

[57] ABSTRACT

A CPUA with a master clock sends a communication time count command to a CPUB whose time is to be compensated. In addition, the CPUA starts a timer. When the CPUA receives a reply to the communication time count command from the CPUB, the CPUA subtracts a predetermined time t that is from when the CPUB receives the communication count command until it sends a reply thereto from a count time T of the timer, so as to calculate the actual communication time between the CPUs. The CPUA notifies the CPUB whose time is to be compensated of the inter-CPU communication time and the time information counted according to the master clock. The CPUB compensates the time information counted by its internal clock according to the inter-CPU communication time and the time information received from the CPUA.

12 Claims, 16 Drawing Sheets

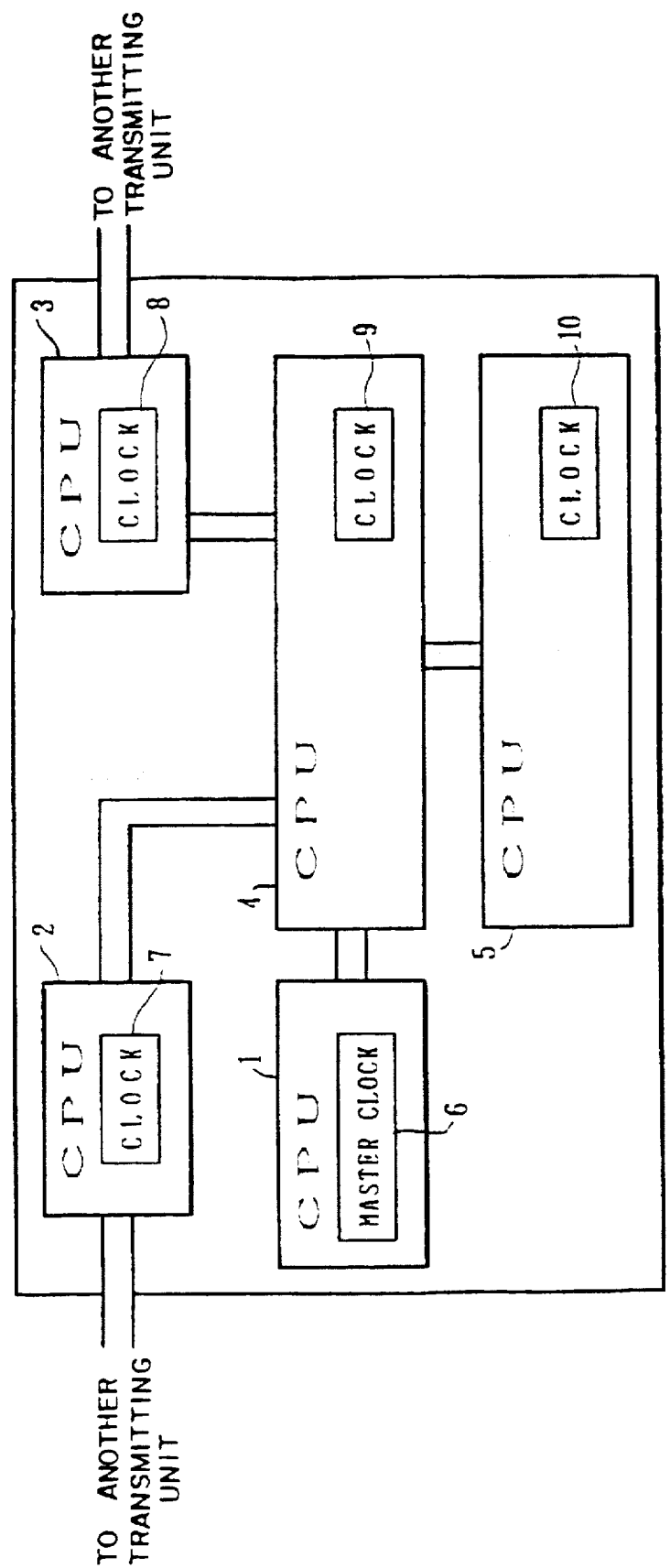
F I G. 4

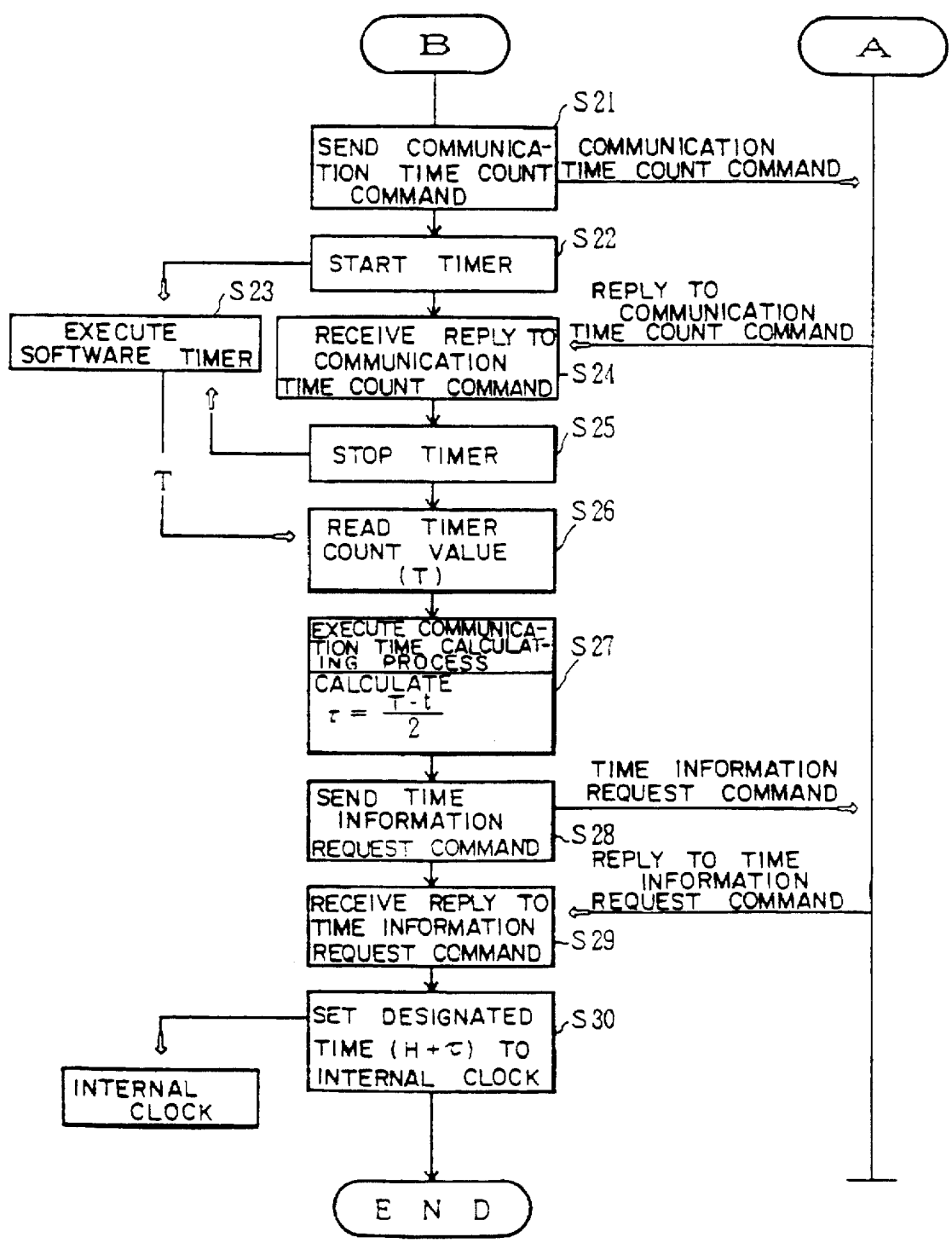
F I G. 10

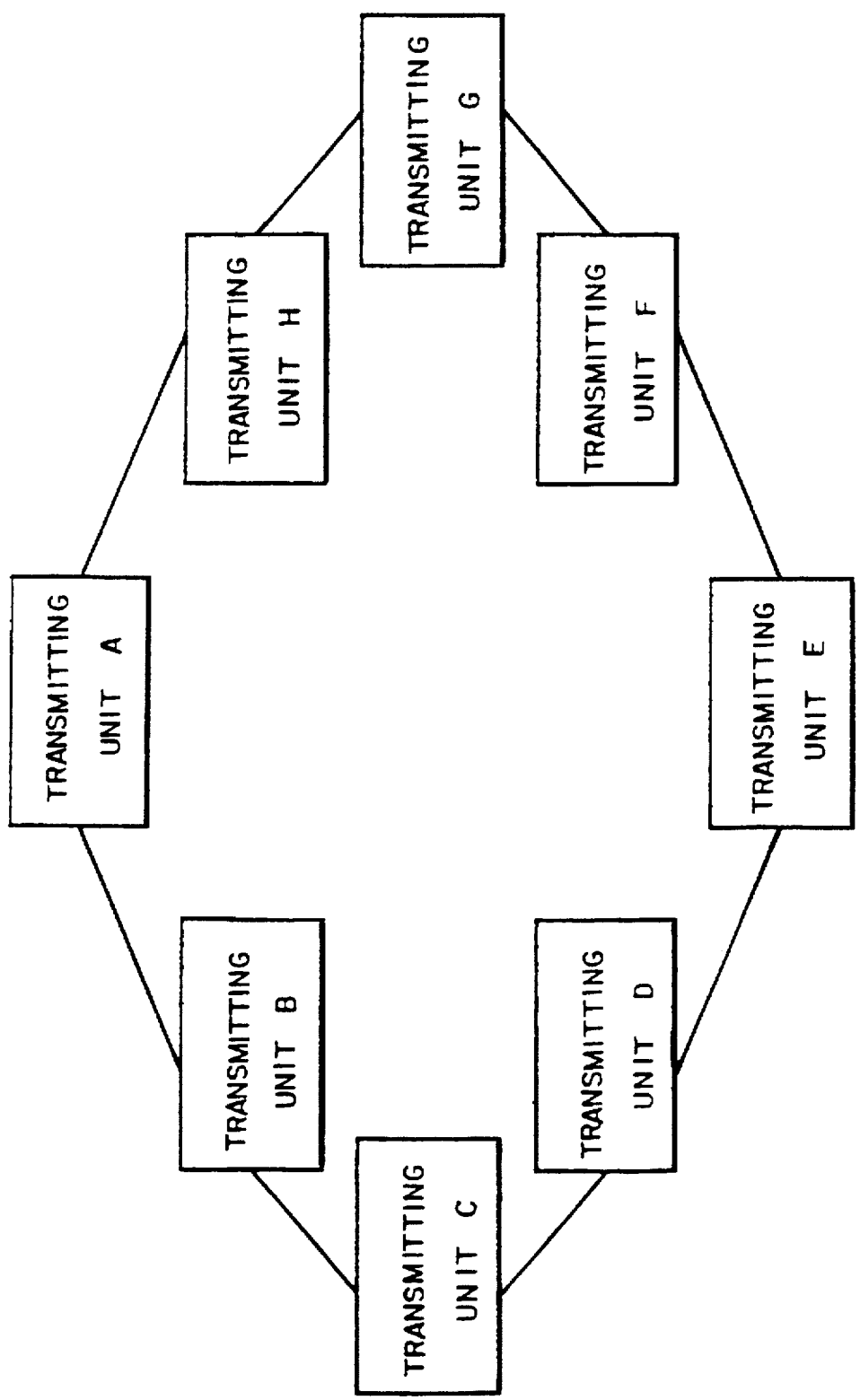
F I G. 13

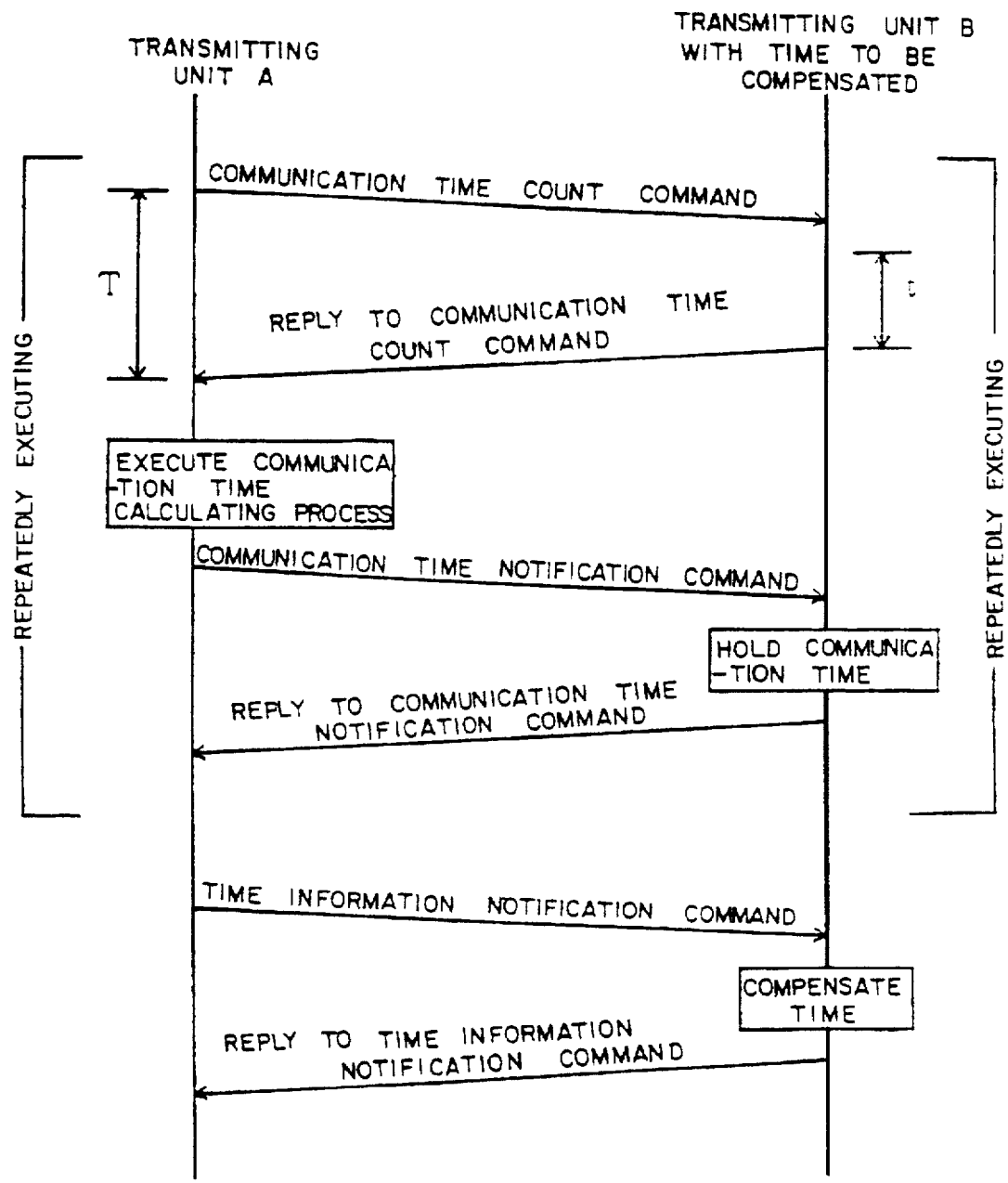
F I G. 15

METHOD FOR COMPENSATING TIME IN TRANSMITTING UNIT AND TRANSMITTING SYSTEM

BACKGROUND OF THE INVENTION

1. Field of the Invention

The present invention relates to a time compensating method for compensating time in a transmitting unit having a first CPU that is operated according to a master clock signal and a second CPU that is operated according to a clock signal generated independently from the master clock signal, in a transmitting system having a first transmitting unit that is operated according to a master clock signal and a second transmitting unit that is operated according to a clock signal generated independently from the master clock signal, and to the transmitting unit and the transmitting system in which a time is compensated.

2. Description of the Related Art

In a transmitting unit having a plurality of CPUs that are operated according to respective clock signals generated independently from each other, or a transmitting system having a plurality of transmitting units that are operated according to clock signals generated independently from each other, when collected information is analyzed, if time information involved in data information does not accord with time information in the CPUs or transmitting units, the results of information analysis will be corrupted. Thus, the time information in each CPU or each transmitting unit should accord with that in other CPUs or other transmitting units.

To cause the time of each CPU or transmitting unit to accord with that of other CPUs or transmitting units, the time of a particular CPU or transmitting unit should be matched with that of another CPU or transmitting unit with a master information management clock.

In this case, time information of the CPU or transmitting unit with the master information management clock is sent to the other CPUs or transmitting units so as to compensate the time thereof according to this time information. At this point, communication delay time while the time information is being sent between the CPUs or transmitting units is an important consideration.

However, this compensated value is conventionally a fixed value for the communication time between the CPUs or transmitting units. Thus, if the length of the transmission path between CPUs in a transmitting unit is varied or the length of the transmission path between transmitting units is varied due to a change in the connection of CPUs or the transmission units, the time of each CPU or transmitting unit deviates from that of a CPU with a master information management clock. Thus, the results of information analysis are adversely affected.

SUMMARY OF THE INVENTION

An object of the present invention is to allow the time of each CPU or transmitting unit to accord with each other regardless of a change in the length of the transmission path between CPUs in a transmitting unit or between transmitting units.

According to the present invention, a CPUA with a master clock sends a communication time count command to a CPUB, whose time is to be compensated, and starts a timer. When the CPUA receives a reply to the communication time count command from the CPUB, the CPUA subtracts a predetermined time t that is from when the CPUB receives the communication count command until the CPUB sends the reply, from the time T counted by the timer, so as to calculate the real inter-CPU communication time, for example, (T-t/2). The CPUA sends this inter-CPU communication time and the time information counted according to the master clock to the CPUB. The CPUB compensates the time information counted by its internal clock according to the inter-CPU communication time and the time information received from the CPUA.

According to the present invention, the inter-CPU/inter-transmitting-unit communication time necessary for communication between CPUs in a transmission unit and between transmitting units is obtained. The time of a CPU/transmitting unit is compensated according to the inter-CPU/inter-transmitting-unit communication time. Thus, the time of each CPU in a transmitting unit or the time of each transmitting unit can be matched with the time of other CPUs or transmitting units.

These and other objects, features and advantages of the present invention will become more apparent in the light of the following detailed description of best mode embodiments thereof, as illustrated in the accompanying drawings.

BRIEF DESCRIPTION OF DRAWINGS

FIG. 4 is a block diagram showing a transmitting unit according the embodiment;

FIG. 10 is a flow chart showing a time compensating process on the CPUB side whose time is to be compensated according to the third embodiment;

FIG. 13 is a schematic diagram showing a construction of a transmission system;

FIG. 15 is a second diagram showing an inter-transmitting-time compensating sequence.

DESCRIPTION OF PREFERRED EMBODIMENTS

Figure 1:
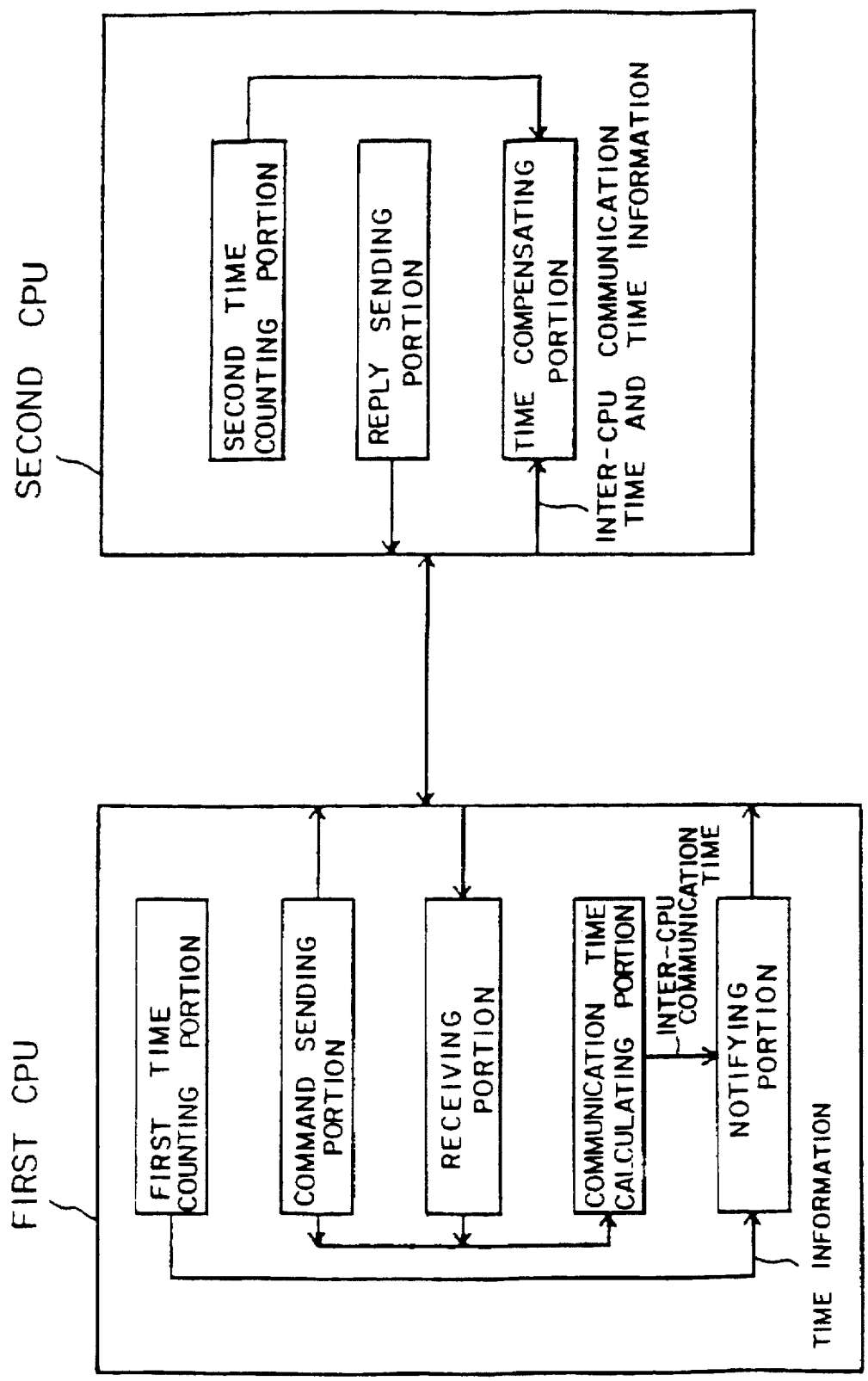
FIG. 1 is a principle block diagram of a first aspect of the present invention.

FIG. 1 is a principle block diagram showing a transmitting unit (or a transmitting system) according to a first aspect of the present invention. The transmitting unit has a first CPU and a second CPU. The first CPU is operated according to a master clock signal. The second CPU is operated according to a clock signal generated independently from the master clock signal. The time of the second CPU is compensated according to the time information from the first CPU. The transmitting system has a first transmitting unit and a second transmitting unit. The first transmitting unit is operated according to a master clock signal. The second transmitting unit is operated according to a clock signal generated independently from the master clock signal. The time of the second transmitting unit is compensated according to the time information from the first transmitting unit.

The first CPU comprises a first time counting portion, a command sending portion, a receiving portion, a communication time calculating portion, and a notifying portion.

The first time counting portion counts time according to the master clock signal.

The command sending portion sends a communication time count command for counting the inter-CPU communication time to the second CPU, whose time is to be compensated.

The receiving portion receives a reply to the communication time count command from the second CPU.

The communication time calculating portion calculates the inter-CPU communication time necessary for communication between the first CPU and the second CPU, according to time information that is from when the first CPU sends the communication time count command until the first CPU receives a reply, and a predetermined time that is from when the second CPU receives the communication time count command until the second CPU sends a reply.

The notifying portion notifies the second CPU of the inter-CPU communication time information calculated by the communication time calculating portion, and the time information counted by the first time counting portion.

The second CPU, whose time is to be compensated, comprises a second time counting portion, a reply sending portion, and a time compensating portion.

The second time counting portion counts time according to a clock signal generated independently from the master clock signal.

When the reply sending portion receives the communication time count command from the first CPU, after a predetermined time elapses, the reply sending portion sends a reply to the communication time count command from the first CPU. The reply sending portion has, for example, a timer. When the second CPU receives the communication time count command, the reply sending portion starts the timer. When the time counted by the timer becomes a predetermined time, the reply sending portion sends the reply to the first CPU. Thus, the reply sending portion can always sends a reply to the communication time count command after a predetermined time interval, to the first CPU.

The time compensating portion compensates the time counted by the second time counting portion according to the inter-CPU communication time and the time information subsequently received from the first CPU.

Figure 2:
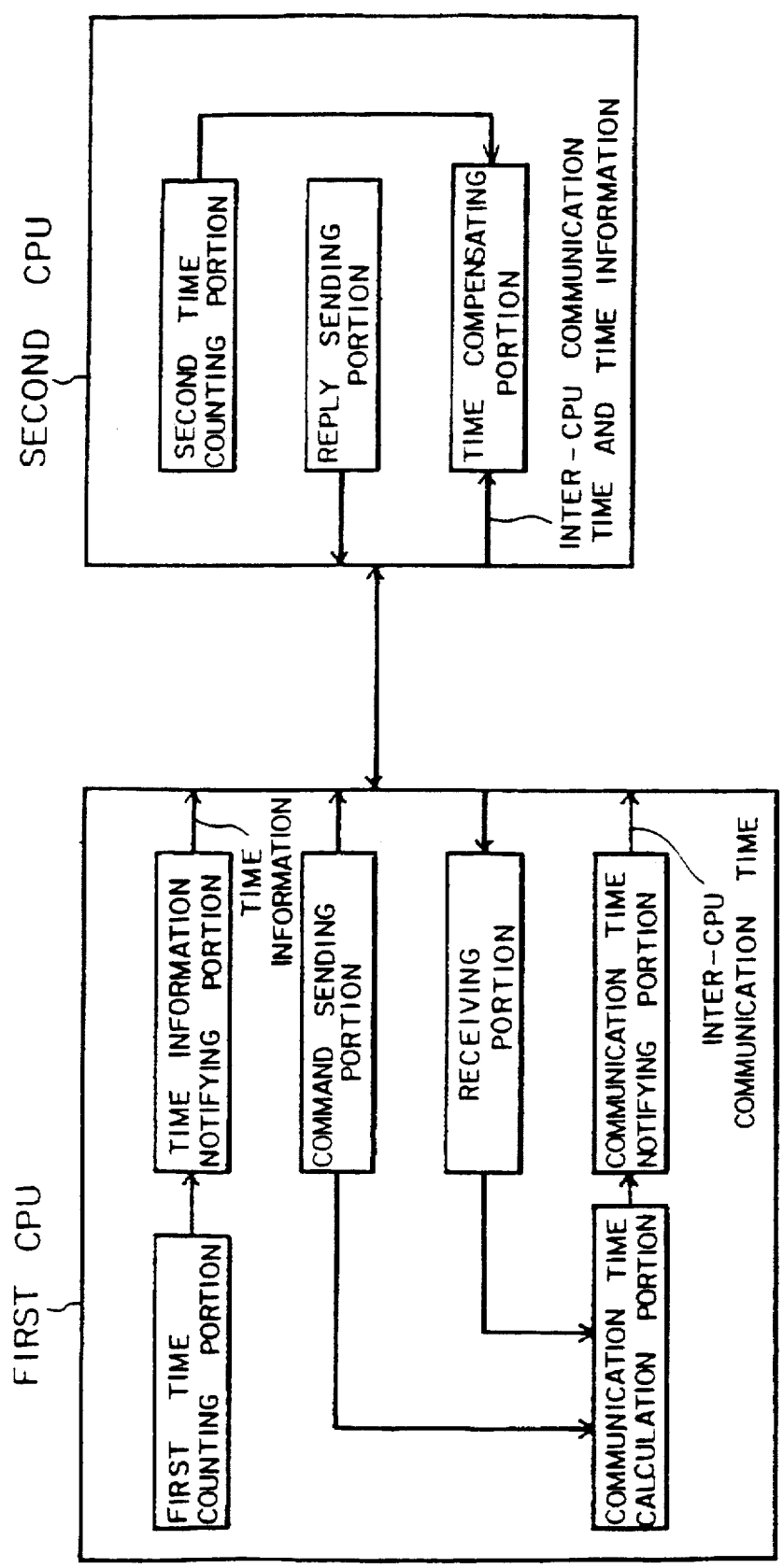
FIG. 2 is a principle block diagram of a second aspect of the present invention.

FIG. 2 is a principle block diagram showing a transmitting unit according to a second aspect of the present invention. The transmitting unit has a first CPU and a second CPU. The first CPU is operated according to a master clock signal. The second CPU is operated according to a clock signal generated independently from the master clock signal. The time of the second CPU is compensated according to the time information of the first CPU.

The first CPU comprises a first time counting portion, a command sending portion, a receiving portion, a communication time calculating portion, a communication time notifying portion, and a time information notifying portion.

The first time counting portion counts time according to the master clock signal.

The command sending portion sends a communication time count command for counting the time necessary for the communication between the CPUs to the second CPU at predetermined intervals.

The receiving portion receives a reply to the communication time count command from the second CPU.

The communication time calculating portion calculates the inter-CPU communication time necessary for communication between the first CPU and the second CPU according to time information that is after the first CPU sends the communication time count command until the first CPU receives a reply thereto, and a predetermined time that is after the second CPU receives the communication time count command until the second CPU sends a reply thereto.

The communication time notifying portion notifies the second CPU of the inter-CPU communication time calculated by the communication time calculating portion.

The time information notifying portion notifies the second CPU of the time information counted by the first time counting portion.

The second CPU whose time is to be compensated comprises a second time counting portion, a reply sending portion, and a time compensating portion.

The second time counting portion counts time according to the clock signal generated independently from the master clock signal.

When the second CPU receives the communication time count command from the first CPU, after a predetermined time elapses, the reply sending portion sends a reply to the communication time count command to the first CPU.

The time compensating portion compensates time counted by the second time counting portion according to the time information received from the first CPU and the inter-CPU communication time received at predetermined intervals.

Figure 3:
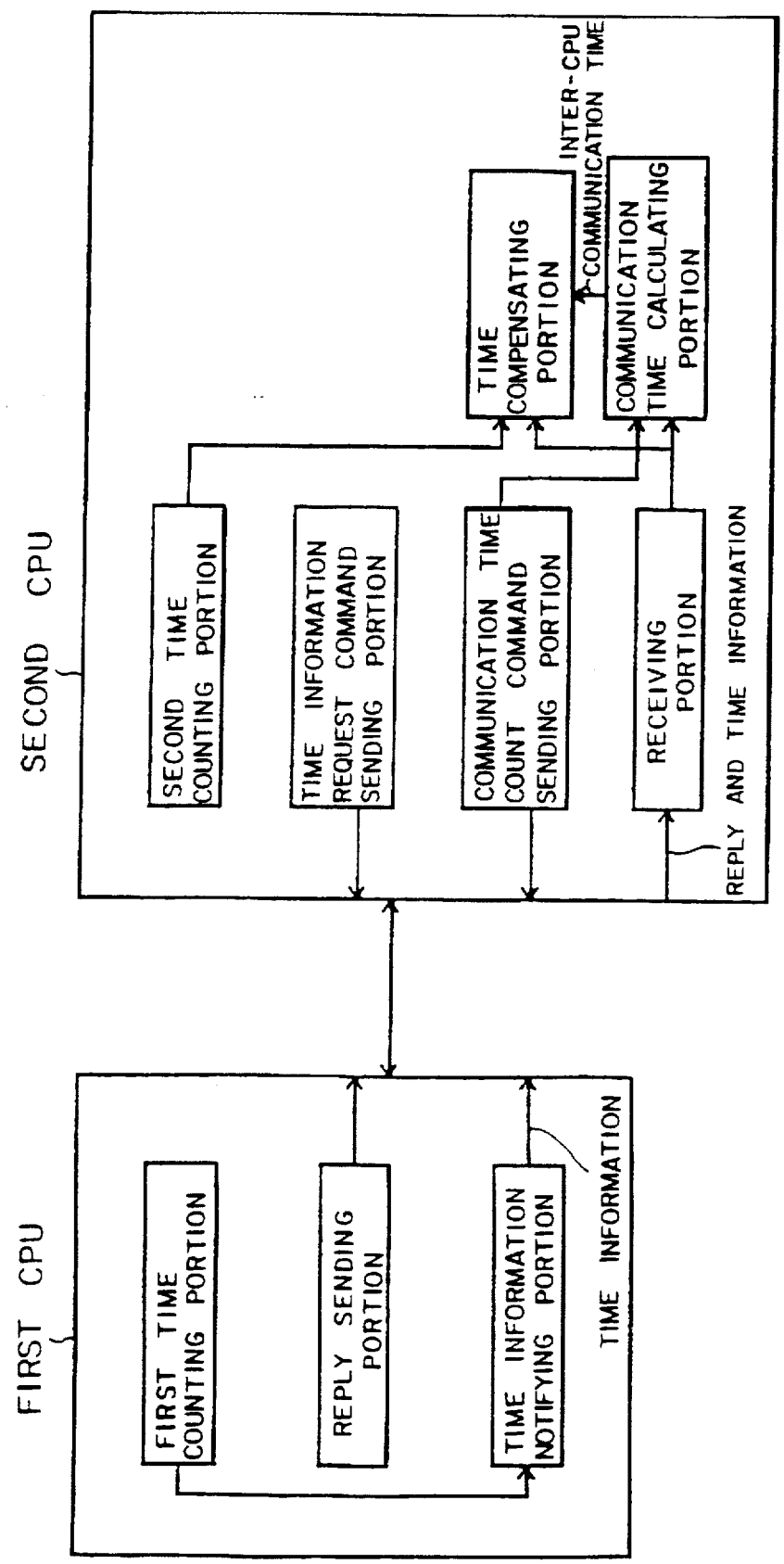
FIG. 3 is a principle block diagram of a third aspect of the present invention.

FIG. 3 is a principle block diagram showing a transmitting unit according to a third aspect of the present invention. The transmitting unit has a first CPU and a second CPU. The first CPU is operated according to a master clock signal. The second CPU is operated according to a clock signal generated independently from the master clock signal. The time of the second CPU is compensated according to the time information of the first CPU.

The first CPU comprises a first time counting portion, a reply sending portion, and a time information notifying portion.

The first time counting portion counts time according to the master clock signal.

When the first CPU receives a communication time count command, after a predetermined time elapses, the reply sending portion sends a reply to the communication time count command to the second CPU.

The time information notifying portion notifies the second CPU of the time information counted by the first time counting portion.

The second CPU whose time is to be compensated comprises a second time counting portion, a communication time count command sending portion, a time information request command sending portion, a receiving portion, a communication time calculating portion, and a time compensating portion.

The second time counting portion counts time according to the clock signal generated independently from the master clock signal.

The communication time count command sending portion sends a communication time count command for counting the time necessary for the communication between the CPUs to the first CPU.

The time information request command sending portion sends a time information request command to the first CPU. The time information request command causes the first CPU to send its time information to the second CPU.

The receiving portion receives a reply to the communication time count command and the time information according to the time information request command from the first CPU.

The communication time calculating portion calculates the inter-CPU communication time necessary for communication between the first CPU and the second CPU according to time that is after the second CPU sends the communication time count command until the second CPU receives a reply thereto from the first CPU, and a predetermined time that is after the first CPU receives the communication time count command until the first CPU sends a reply thereto.

The time compensating portion compensates the time counted by the second time counting portion according to the inter-CPU communication time calculated by the communication time calculating portion and the time information received from the first CPU.

In the first aspect of the present invention, the first CPU (or the first transmitting unit: this applies hereinafter) sends the communication time count command to the second CPU (or the second transmitting unit: this applies hereinafter) whose time is to be compensated. The first CPU calculates the time counted until it receives a reply to the communication time count command from the second CPU, so as to obtain time necessary for communication between the CPUs.

Thus, even if the length of the communication path between CPUs in a transmitting unit is varied, the time necessary for the communication between the CPUs can be accurately obtained, thereby more precisely compensating the time of a CPU whose time is to be compensated.

In the second aspect of the present invention, the first CPU sends the communication time count command to the second CPU, whose time is to be compensated, at predetermined intervals. The first CPU calculates the inter-CPU communication time and sends it to the second CPU so that the second CPU holds the inter-CPU communication times.

Thus, even if the communication path between CPUs or transmitting units is dynamically varied, the second CPU or the second transmitting unit calculates, for example, the mean value of the inter-CPU communication time. Thus, an error of the inter-CPU communication time or inter-transmitting-unit communication time can be reduced, thereby more precisely compensating the time of the second CPU or the second transmitting unit.

In the third aspect of the present invention, the second CPU whose time is to be compensated sends the communication time count command to the first CPU so that the second CPU calculates the inter-CPU communication time.

Thus, the inter-CPU communication time or the inter-transmitting-unit communication time can be exactly calculated without increasing the load of the first CPU or the first transmitting unit, thereby more precisely compensating the time of second CPU.

Next, with reference to the accompanying drawings, an embodiment of the present invention will be described. FIG. 4 is a block diagram showing the construction of a transmitting unit according to the embodiment of the present invention. The transmitting unit has a plurality of CPUs that are CPU 1 to CPU 5, each of which is connected through a bus system. The CPU 1 has an information management clock (master clock) 6 that counts time according to a master clock signal. The CPU 2 to CPU 5 have information management clocks (internal clocks) 7 to 10 respectively, that count time according to respective clock signals generated independently from the master clock signal. A plurality of transmitting units with the above described construction are connected through a communication line. As a result, a transmitting system is constructed.

First, the case that the time compensating method according to the present invention is applied to a transmitting unit will be described. The transmitting unit has a CPU 1 with a master clock 6 and CPU 2 to CPU 5 with respective internal clocks 7 to 10 that are independently from the master clock 6.

Figure 5:
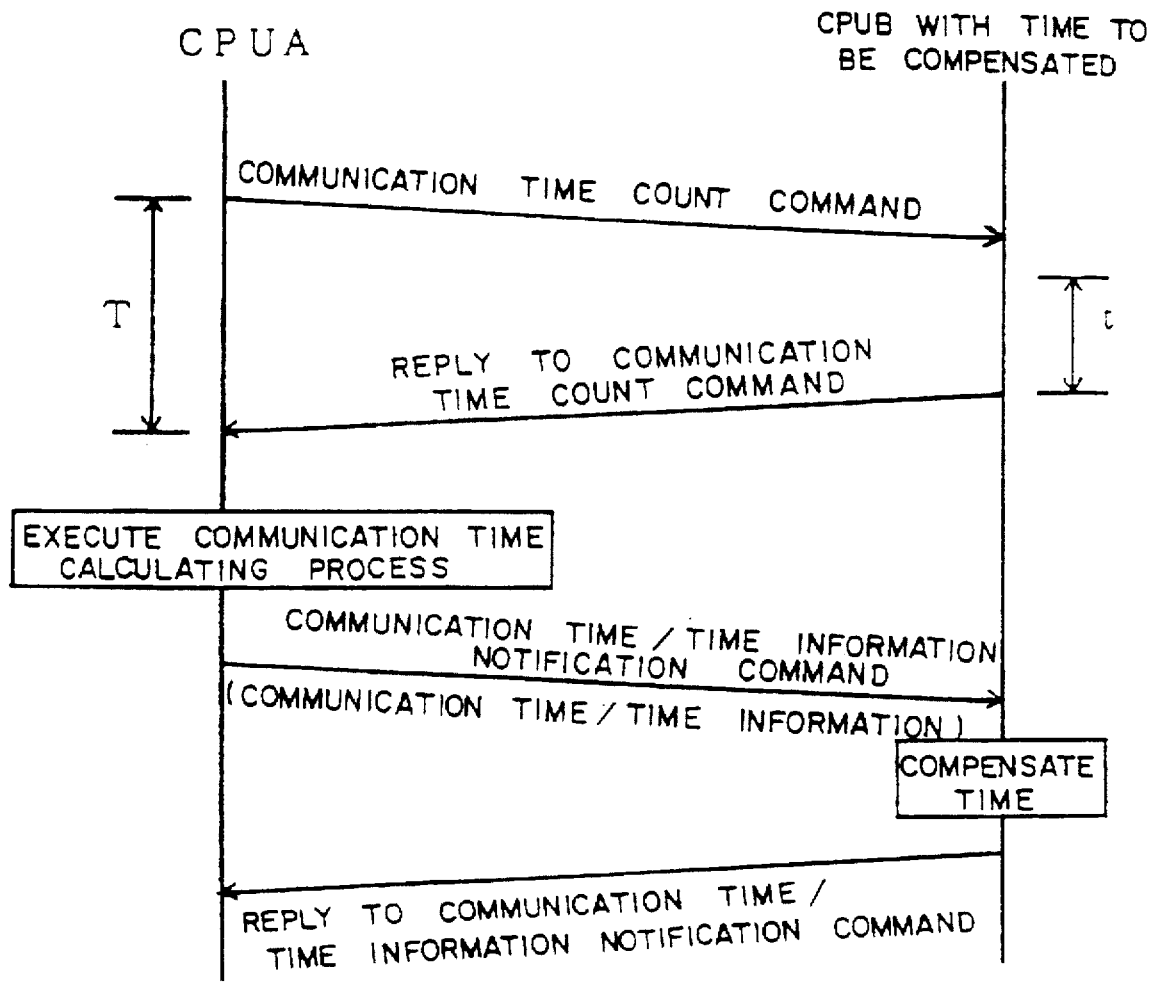
FIG. 5 is a diagram showing an inter-CPU time compensating sequence according to a first embodiment.

FIG. 5 is a diagram showing an inter-CPU time compensating sequence for causing the CPU 1 to calculate the inter-CPU communication time and notifying another CPU whose time is to be compensated of the result.

The CPU 1 (thereinafter referred to as CPUA) with the master clock sends a communication time count command to a CPUB with whose time is to be compensated so as to calculate inter-CPU communication time. In addition, the CPUA starts a timer so as to count the time after the CPUA sends the communication time count command.

When the CPUB receives the communication time count command, after a predetermined time t elapses, the CPUB sends a reply to the communication time count command to the CPUA.

When the CPUA receives the reply to the communication time count command, it stops the timer and obtains time T counted by the timer. Thereafter, the CPUA subtracts the predetermined reply time t of the CPUB from the count time T so as to calculate the time necessary for the communication between the CPUs. After the CPUA obtains the inter-CPU communication time, it sends a communication time/ time information notification command to the CPUB so as to notify the CPUB of the inter-CPU communication time and the time information of the master clock.

After the CPUB receives the communication time/time information notification command from the CPUA, the CPUB compensates the time of its internal clock according to the communication time and the time information. Thereafter, the CPUB sends a reply to the communication time/time information notification command received from the CPUA.

Next, the time compensating process of the CPUA and the CPUB whose time is to be compensated in the inter-CPU time compensating sequence shown in FIG. 5, will be described with reference to flow charts of FIGS. 6 and 7.

Figure 6:
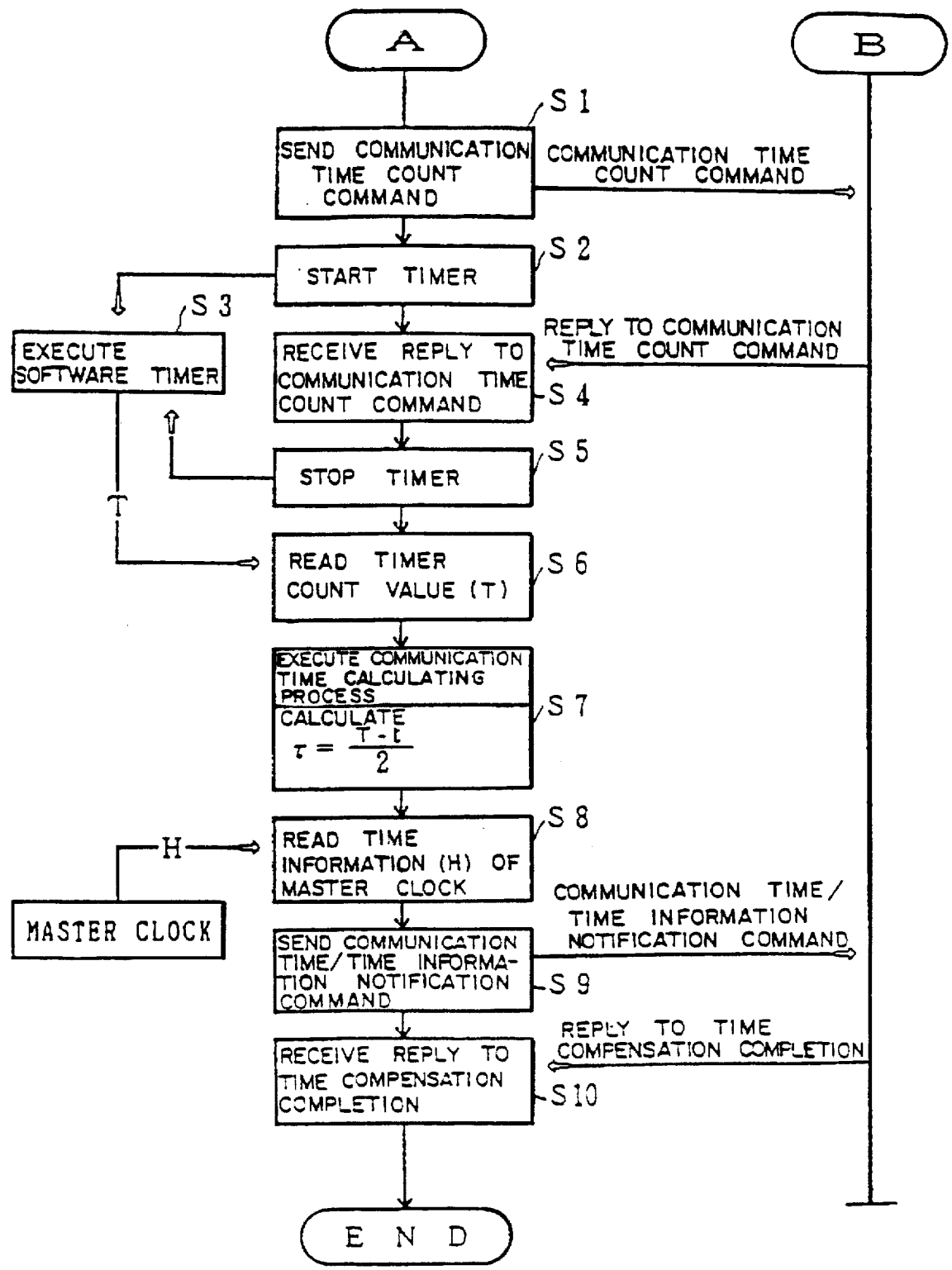
FIG. 6 is a flow chart showing a time compensating process on a CPUA side according to the first embodiment.

The CPUA sends a communication time count command to the CPUB at step S1 of FIG. 6. At step S2, the CPUA starts a timer that counts time after the CPUA sends the communication time count command until it receives a reply thereto. At step S3, the CPUA executes the software timer process so as to start counting the elapsed time after the CPUA sends the communication time count command.

Figure 7:
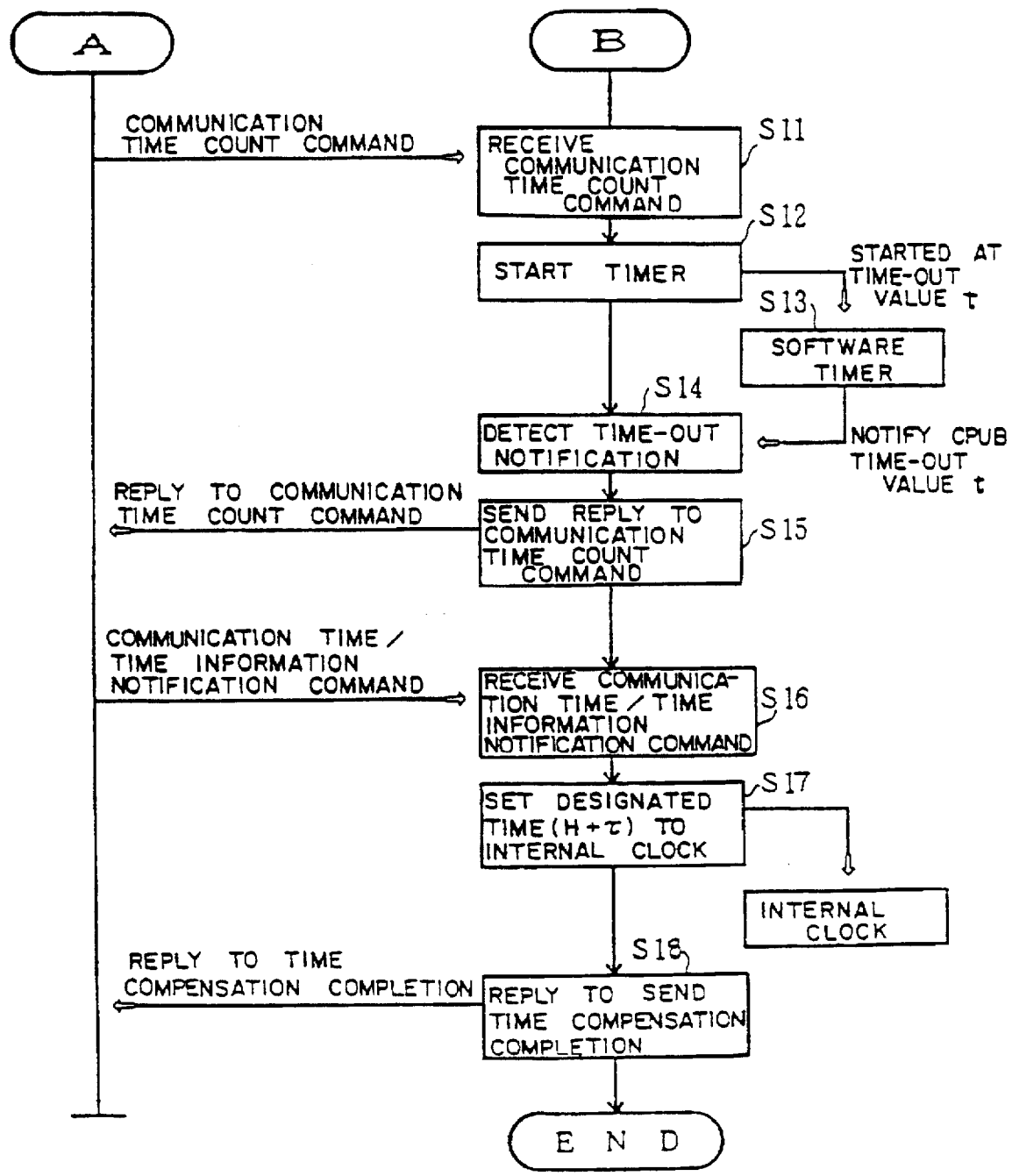
FIG. 7 is a flow chart showing a time compensating process on a CPUB side whose time is to be compensated according to the first embodiment.

On the other hand, when the CPUB receives the communication time count command from the CPUA at step S11 of FIG. 7, the CPUB starts a timer that counts elapse time after the CPUB receives the communication time count command at step S12. At step S13, the CPUB executes the software timer process so as to start counting for a predetermined reply time after the CPUB receives the communication time count command. When the count time of the software timer becomes a predetermined reply time (time-out value) t, the software timer process outputs time-out notification to the CPUB.

When the CPUB receives the time-out notification of the software timer at step S14, the CPUB sends a reply to the communication time count command to the CPUA at step S15. The CPUB counts for a predetermined time t by the software timer after the CPUB receives the communication time count command. Because if the time for the CPUB to send the reply to the CPUA deviates, an error takes place in calculating the inter-CPU communication time. Thus, the CPUB sends the reply to the communication time count command to the CPUA with a delay of a predetermined time t after the CPUB receives the communication time count command.

After the CPUA receives a reply to the communication time count command from the CPUB at step S4 of FIG. 6, the CPUA stops the software timer that started counting after CPUA sent the communication time count command at step S5 and reads the count value T of the software timer at step S6.

The communication time calculating process at step S7 subtracts the predetermined reply time t of the CPUB (namely, time that is after the CPUB receives the communication time count command until it sends a reply thereto) from time T counted by the software timer, that is the time from when the CPUA sends the communication command until it receives a reply thereto, and then divides the subtracted result by "2" so as to obtain the inter-CPU communication time τ between the CPUA and the CPUB whose time is to be compensated. The reply time t that is after the CPUB receives the communication time count command until it sends the reply has been designated previously as a fixed value for each CPU. These fixed value for each CPU have been sent to the CPUA.

The CPUA reads the time information H counted according to the master clock 6 at step S8 and sends the communication time/time information notification command to the CPUB at step S9. The communication time/time information notification command includes a command type, inter-CPU communication time τ obtained at step S7, and time information H obtained at step S8.

When the CPUB receives the communication time/time information notification command at step S16 of FIG. 7, the CPUB sets the time that add the this time, time information H of master clock 6 and inter-CPU communication time τ, to the internal clock (the information management clock of the CPUB). Thus, the time of the CPUB is compensated so that it accords with the time of the CPUA with the master clock.

After the time compensation of the CPUB is completed, the CPUB sends a time compensation completion reply to the CPUA at step S18. As a result, the CPUB completes the time compensation process.

When the CPUA receives the time compensation completion reply from the CPUB at step S10 of FIG. 6, the CPUA completes the time compensating process.

Figure 8:
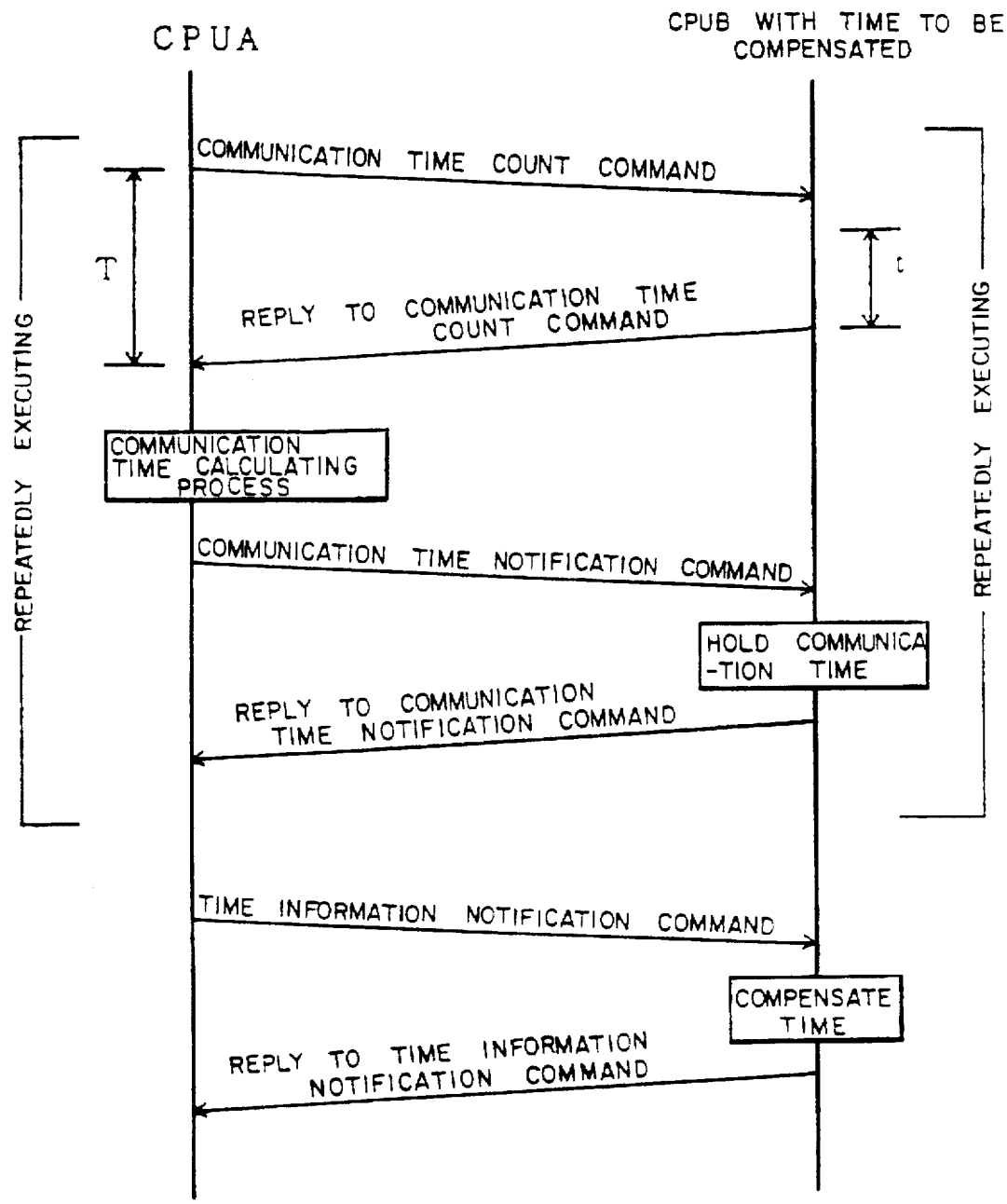
FIG. 8 is a diagram showing an inter-CPU time compensating sequence according to a second embodiment.

Next, the operation of a second embodiment according to the present invention will be described with reference to FIG. 8. FIG. 8 is a schematic diagram showing an inter-CPU time compensating sequence according to the second embodiment.

In the second embodiment, the inter-CPU communication time is counted at predetermined intervals and the counted result is repeatedly sent to the CPUB whose time is to be compensated.

In FIG. 8, the CPUA with a master clock 6 sends a communication time count command to the CPUB. In addition, the CPUA starts a timer that counts the elapsed time after the CPUA sends a communication time count command until it receives the reply thereto.

When the CPUB receives the communication time count command, after a predetermined time elapses, the CPUB sends a reply to the communication time count command to the CPUA.

After the CPUA receives the reply to the communication time count command, the CPUA stops the timer and obtains count time T of the timer. Thereafter the CPUA subtracts reply time t of the CPUB from the count time T so as to calculate time necessary for the inter-CPU communication. After the CPUA obtains the inter-CPU communication time, the CPUA adds it to the communication time notification command and sends the resultant command to the CPUB.

The CPUB stores the received inter-CPU communication time and sends a reply to the communication time notification command to the CPUA.

The above-described process is executed at predetermined intervals so that the CPUA always notifies the CPUB with whose time is to be compensated of the latest inter-CPU communication time.

After the CPUB receives the time information notification command from the CPUA, the CPUB compensates the time of its internal clock according to time information included in the time information notification command and the mean value of the inter-CPU communication time information held in the CPUB.

Figure 9:
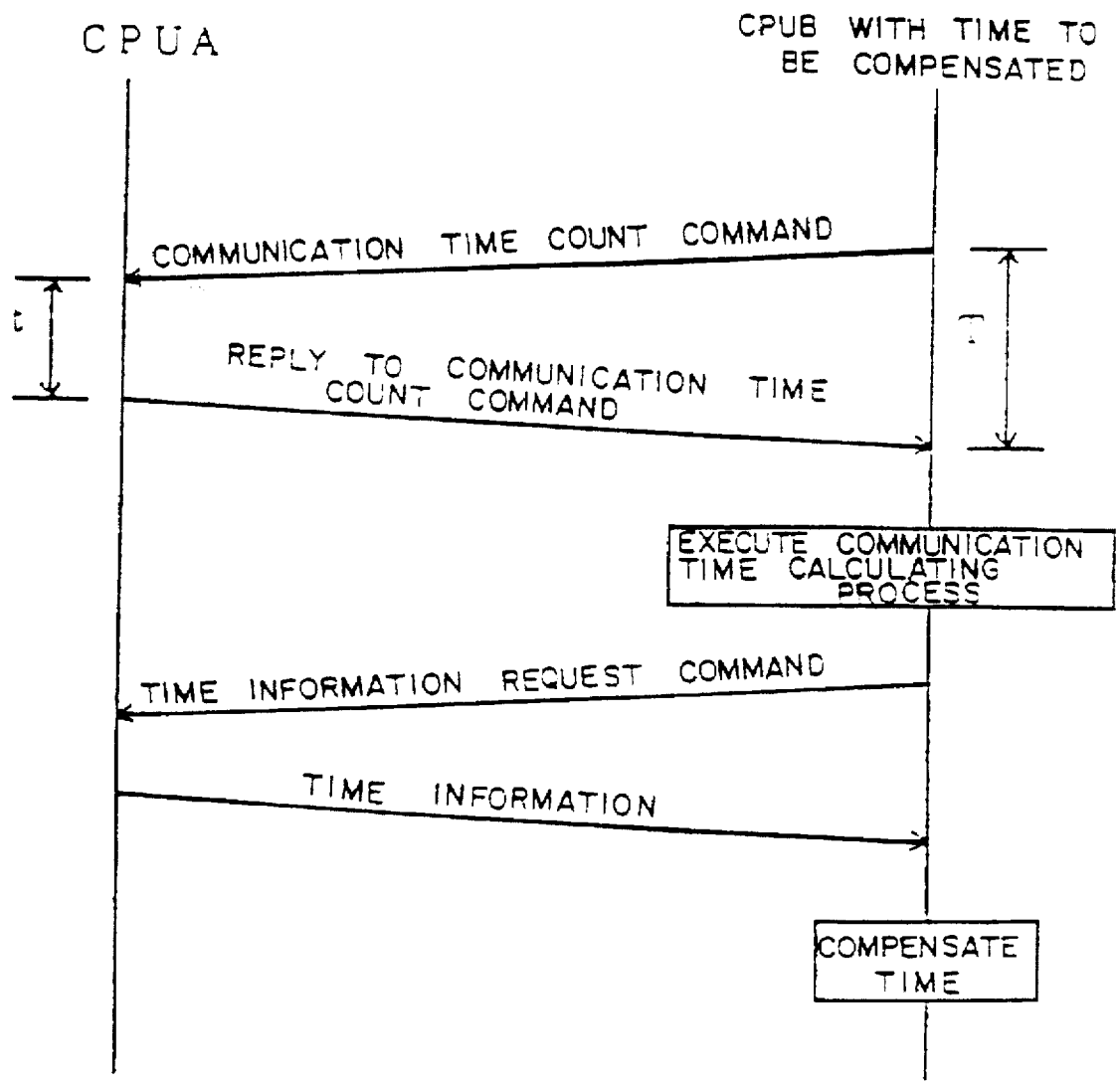
FIG. 9 is a diagram showing an inter-CPUT time compensating sequence according to a third embodiment.

Next, the operation of a third embodiment of the present invention will be described with reference to FIG. 9. FIG. 9 is a schematic diagram showing an inter-CPU time compensating sequence according to the third embodiment. In the third embodiment, a CPUB whose time is to be compensated calculates inter-CPU communication time and compensates time thereby.

In FIG. 9, the CPUB whose time is to be compensated sends a communication time count command to a CPUA with a master clock 6, and starts a timer that counts elapsed time after the CPUB sends the communication time count command to the CPUA.

When the CPUA receives the communication time count command, after a predetermined time t elapses, the CPUA sends a reply to the communication time count command to the CPUB.

After the CPUB receives the reply from the CPUA, the CPUB calculates the actual inter-CPU communication time according to the time T that is counted by the timer (namely, from the time the CPUB sends the communication time count command until it receives the reply thereto from the CPUA) and the reply time t of the CPUA, as described earlier.

In addition, the CPUB sends a time information request command so as to obtain time information from the CPUA with the master clock 6. Thereafter, the CPUB compensates the time of its internal clock according to the time information and the calculated inter-CPU communication time.

Next, the time compensating process of the CPUB whose time is to be compensated, and the time compensating process of the CPUA in the inter-CPU time compensating sequence of FIG. 9 will be described with reference to the flow charts of FIGS. 10 and 11.

The CPUB sends a communication time count command for counting inter-CPU communication time to the CPUA at step S21 of FIG. 10. At step S22, the CPUB start a timer that counts time after the CPUB sends the communication time count command until it receives the reply thereto at step S22. Thus, at step S23, the CPUB executes a software timer process that counts the elapsed time after the CPUB sends the communication time count command until it receives the reply thereto.

Figure 11:
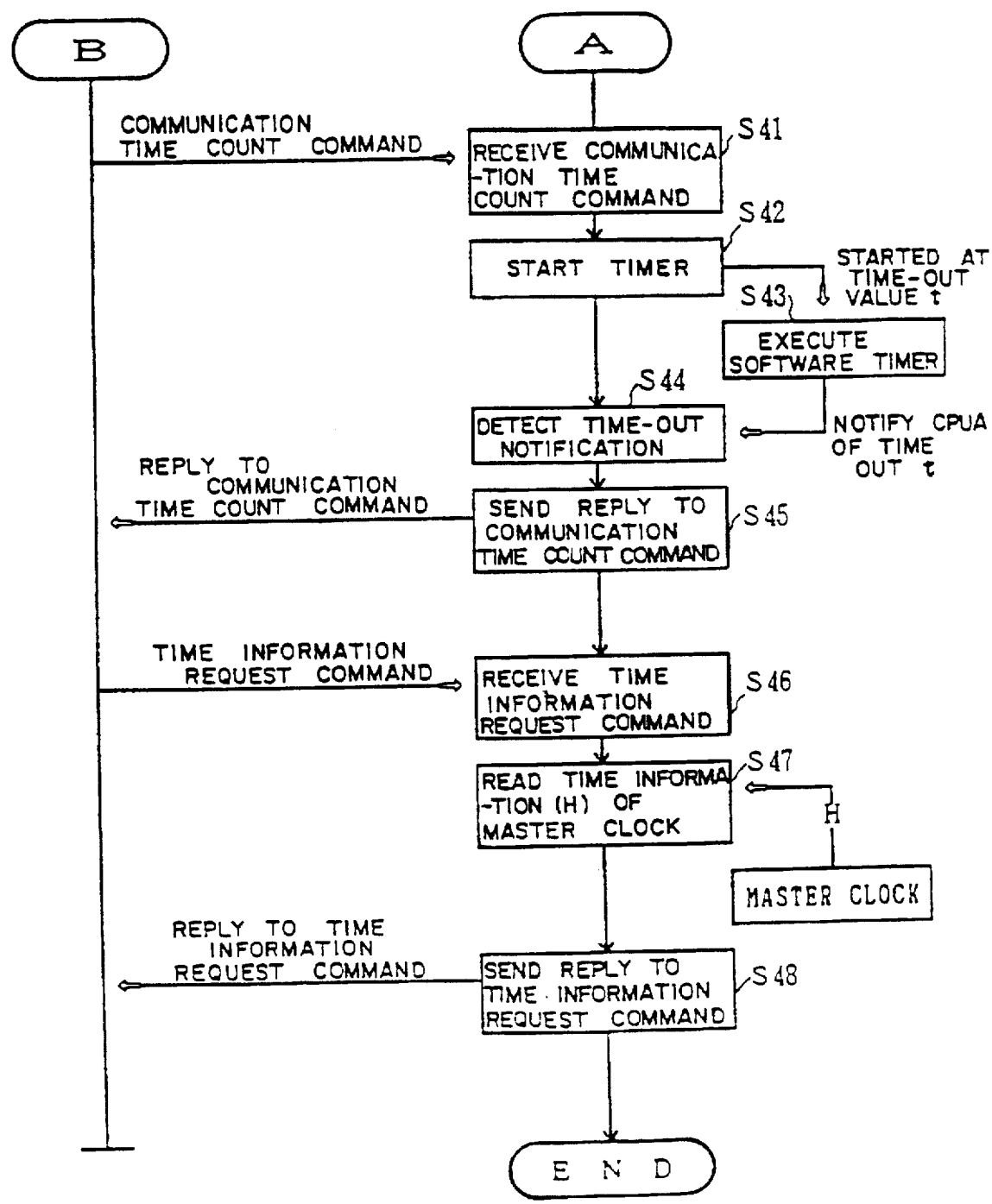
FIG. 11 is a flow chart showing a time compensating process on the CPUA side according to the third embodiment.

On the other hand, when the CPUA with the master clock 6 receives the communication time count command at step S41 of FIG. 11, the CPUA start a timer that counts until the CPUA sends a reply the communication time count command, at step 42. And at step S3, the CPUA executes the software timer process that counts for a predetermined time after the CPUA receives the communication time count command. When the count time of the software timer becomes a predetermined reply time t (time-out value), the software timer outputs time-out notification to the CPUA.

When the CPUA detects the time-out notification from the software timer at step S44, the CPUA sends a reply to the communication time count command to the CPUB at step S45.

After the CPUB receives the reply to the communication time count command at step S24 of FIG. 10, the CPUB stops the execution of the software timer process at step S25. Thus, the software timer process counts time T after the CPUB sends the communication time count command until it receives the reply thereto. At step S26, the CPUB reads the count time T of the software timer.

A communication time calculating process at step S27 subtracts the predetermined reply time t of the CPUA (namely, the time from when the CPUA receives the communication time count command until it sends the reply thereto) from time T that is counted by the software timer (namely, time T that is after the CPUB sends the communication time count command until it receives the reply thereto) and divides the subtracted result by "2", so as to obtain the inter-CPU communication time τ between the CPUA and the CPUB. The predetermined reply time t that is after the CPUA receives the communication time count command until it sends a reply thereto has been designated previously as a fixed value. This fixed value has been sent to each CPU.

After CPUB calculates the inter-CPU communication time, the CPUB sends a time information request command that requests the CPUA to send the time information, to the CPUA at step S28.

When the CPUA receives the time information request command at step S46 of FIG. 11, the CPUA reads time information H counted by the master clock 6 at step S47. Thereafter, the CPUA adds the time information H to a reply to the time information request command and sends the resultant reply to the CPUB.

After the CPUB receives the reply to the time information request command at step S29 of FIG. 10, the CPUB sets this time (namely the calculated inter-CPU communication time τ+time information H of CPUA) to the internal clock of the CPUB.

In the third embodiment, the CPUB whose time is to be compensated calculates the inter-CPU communication time and collects the time information of the CPUA with the master clock so as to compensate the time of its internal clock corresponding these information. Thus, the time of the CPUB can be more precisely compensated without a need to increase the load on the CPUA with the master clock 6.

Next, the case that the time compensating method of the present invention is applied to a transmitting system having a master transmitting unit with an information management clock (master clock) and at least one non-master transmitting units with respective internal clocks independently from the master clock will be described.

Figure 12:
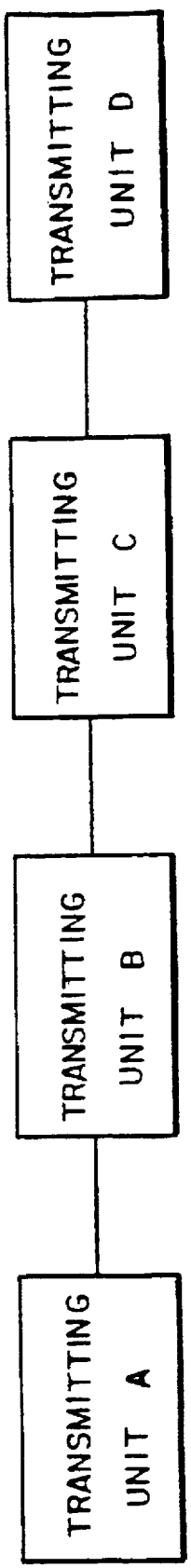
FIG. 12 is a schematic diagram showing a construction of a transmission system.

FIG. 12 shows a construction of a transmitting system having a plurality of transmitting units that are connected in series. FIG. 13 shows a construction of a transmitting system having a plurality of transmitting units that are connected in a loop.

Figure 14:
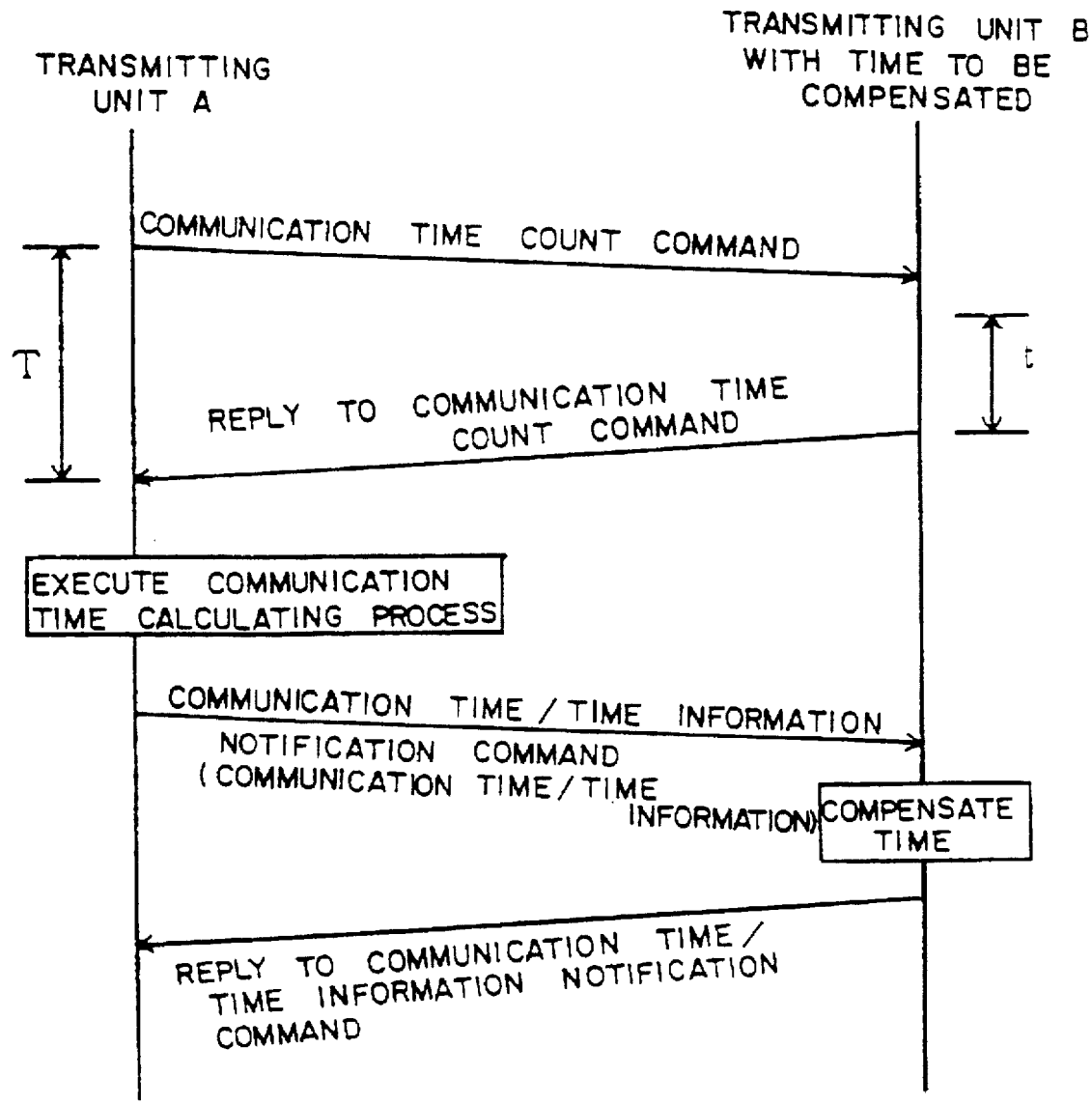
FIG. 14 is a first diagram showing an inter-transmitting-unit time compensating sequence.
Figure 16:
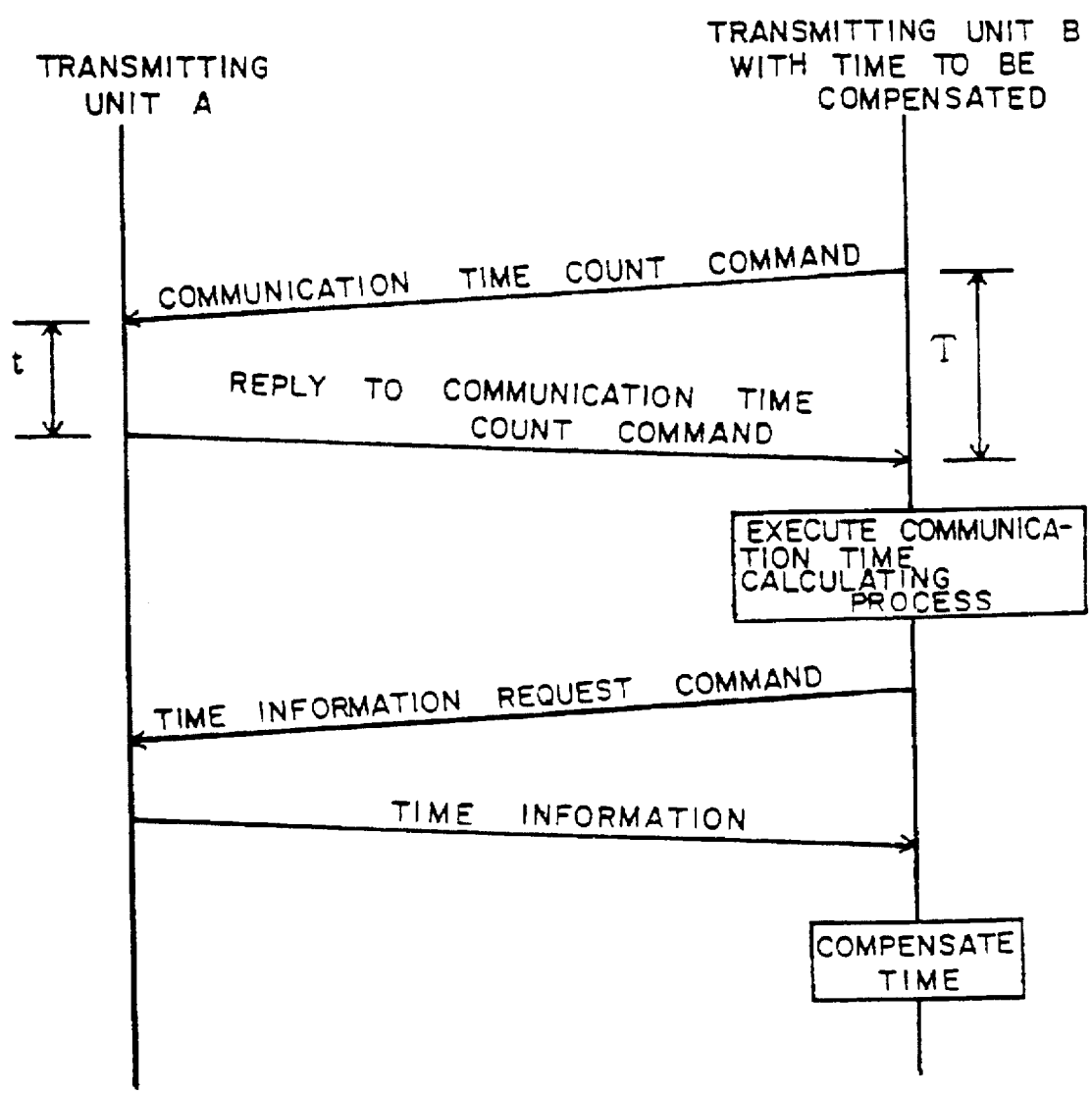
FIG. 16 is a third diagram showing an inter-transmitting-unit time compensating sequence.

FIGS. 14 to 16 are schematic diagrams showing inter-transmitting-unit time compensating sequences in such transmitting systems. FIG. 14 shows an inter-transmitting-unit time compensating sequence in the case that the time compensating method according to the first embodiment (a CPUA with a master clock calculates inter-CPU communication time) is applied to a transmitting system. FIG. 15 shows an inter-transmitting-unit compensating sequence in the case that the time compensating method according to the second embodiment (a CPUA calculates the inter-CPU communication time at predetermined intervals and notifies a CPUB whose time is to be compensated of the calculated inter-CPU communication time) is applied for a transmitting system. FIG. 16 shows an inter-transmitting-unit compensating sequence in the case that the time compensating method according to the third embodiment (a CPUB whose time is to be compensated calculates the inter-CPU communication time and compensates the time thereof) is applied for a transmitting system.

The inter-transmitting-unit time compensating sequences shown in FIGS. 14, 15, and 16 are basically the same as the inter-CPU time compensating sequences shown in FIGS. 5, 8, and 9. Thus, for simplicity, only the time compensating sequence shown in FIG. 14 is described.

In FIG. 14, a transmitting unit A with a master clock sends a communication time count command to a transmitting unit B whose time is to be compensated, and starts a timer that counts elapsed time after the transmitting unit A sends the communication time count command.

When the transmitting unit B receives the communication time count command, it starts a timer. When the count time of the timer becomes a predetermined reply time t, the transmitting unit B sends a reply to the communication time count command to the transmitting unit A.

On the other hand, when the transmitting unit A receives the reply to the communication time count command, it stops the timer and subtracts the reply time t of the transmitting unit B from the count time T of the timer, so as to calculate the actual communication time between the transmitting unit A and the transmitting unit B. Thereafter, the transmitting unit A adds the calculated inter-transmitting-unit communication time and the time information counted by the master clock to a communication time/time information notification command and sends the resultant command to the transmitting unit B.

The transmitting unit B Compensates the time of its internal clock according to the inter-transmitting-unit communication time and the time information received from the transmitting unit A. Thereafter, the transmitting unit B sends a reply to the communication time/time information notification command to the transmitting unit A.

In this embodiment, the time necessary for the communication between the transmitting unit A and the transmitting unit B whose time is to be compensated, is actually counted and the time of the transmitting unit B is compensated according to this counted inter-transmitting-unit communication time. Thus, even in a transmitting system in which the length of the communication path between a transmitting unit A and a transmitting unit B whose time is to be compensated is varied, the time of each transmitting unit can be precisely matched with the time of a transmitting unit with a master clock.

In addition, as in an embodiment shown in FIG. 15, in a transmitting system in which the communication path between transmitting units is dynamically varied, since the communication time between a transmitting unit A with a master clock and a transmitting unit B with time to be compensated is actually counted at predetermined intervals, the communication time between the transmitting units can be always precisely obtained.

According to the present invention, since inter-CPU/inter-transmitting unit communication time necessary for the communication between CPUs in a transmitting unit or the communication between transmitting units is obtained, and the time of a transmitting unit is compensated according to the inter-CPU/inter-transmitting-unit communication time, the time of each CPU in a transmitting unit or the time of each transmitting unit can be precisely matched with each other.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A transmitting unit having a first CPU (Central Processing Unit) operated according to a master clock signal and a second CPU operated according to a clock signal generated independently from the a master clock signal, the time of the second CPU being compensated according to time information from the first CPU, wherein the first CPU comprises:

first time counting means for counting time according to the master clock signal;

command sending means for sending a communication time count command to the second CPU so as to count a communication time between the first CPU and the second CPU;

receiving means for receiving a reply to the communication time count command from the second CPU;

communication time calculating means for calculating an inter-CPU communication time necessary for communication between the first CPU and the second CPU, according to a time that is from when the first CPU sends the communication time count command until the first CPU receives the reply from the second CPU, and a predetermined time that is from when the second CPU receives the communication time count command until the second CPU sends the reply; and notifying means for notifying the second CPU of the inter-CPU communication time calculated by said communication time calculating means and the time information counted by said time mounting means, and wherein the second CPU whose time is to be compensated comprises:

second time counting means for counting time according to a clock signal generated independently from the master clock signal;

reply sending means for sending the reply after a predetermined time elapses after the second CPU receives the communication time count command from the first CPU; and time compensating means for compensating the time counted by said second time counting means according to the inter-CPU communication time and the time information received from the first CPU.

2. The transmitting unit as set forth in claim 1, wherein said reply sending means includes a timer and is adapted for starting the timer when receiving the communication time count command, and for sending a reply to the communication time count command when the count time of the timer becomes a predetermined time-out value.

3. The transmitting unit as set forth in claim 2, wherein said communication time calculating means includes a timer and is adapted for starting the timer when sending the communication time count command and for stopping the timer when receiving the reply to the communication time count command, so as to count the time that is from sending the communication time count command until receiving the reply.

4. A transmitting unit having a first CPU operated according to a master clock signal and a second CPU operated according to a clock signal generated independently from the master clock signal, the time of the second CPU being compensated according to time information from the first CPU, wherein the first CPU comprises:

first time counting means for counting time according to the master clock signal;

command sending means for sending a communication time count command to the second CPU so as to count communication time between the first CPU and the second CPU at predetermined intervals;

receiving means for receiving a reply to the communication time count command from the second CPU;

communication time calculating means for calculating inter-CPU communication time necessary for communication between the first CPU and the second CPU according to the time that is from when the first CPU sends the communication time count command until the first CPU receives the reply from the second CPU, and a predetermined time that is from when the second CPU receives the communication time count command until the second CPU sends the reply;

notifying means for notifying the second CPU of the inter-CPU communication time calculated by said communication time calculating means; and time information notifying means for notifying the second CPU of the time information counted by said first time counting means, and wherein the second CPU whose time is to be compensated comprises:

second time counting means for counting time according to a clock signal generated independently from the master clock signal;

reply sending means for sending the reply after a predetermined time elapses from when the second CPU receives the communication time count command from the first CPU; and time compensating means for compensating the time counted by said second time counting means according to the time information and the inter-CPU communication time received from the first CPU at the predetermined intervals.

5. A transmitting unit having a first CPU operated according to a master clock signal and a second CPU operated according to a clock signal generated independently from the master clock signal, the time of the second CPU being compensated according to time information from the first CPU, wherein the first CPU comprises:

first time counting means for counting time according to a master clock signal;

reply sending means for sending a reply after a predetermined time elapses from when the first CPU receives a communication time count command from the second CPU; and time information notifying means for notifying the second CPU of time information counted by said first time counting means when the first CPU receives a time information request command from the second CPU, and wherein the second CPU whose time is to be compensated comprises:

second time counting means for counting time according to a clock signal generated independently from the master clock signal;

communication time counting command sending means for sending an inter-CPU communication time count command to the first CPU so as to count the time necessary for communication between the first CPU and the second CPU;

time information request command sending means for sending the time information request command to the first CPU so as to request the first CPU to send the time information;

receiving means for receiving the reply to the communication time count command from the first CPU and the time information according to the time information request command;

communication time calculating means for calculating an inter-CPU communication time necessary for communication between the first CPU and the second CPU according to time that is from when the second CPU sends the communication time count command until the second CPU receives the reply from the first CPU, and a predetermined time that is after the first CPU receives the communication time count command until the first CPU sends the reply; and time compensating means for compensating the time counted by said second time counting means according to the inter-CPU communication time calculated by said communication time calculating means and the time information received from the first CPU.

6. A transmitting system having a first transmitting unit operated according to a master clock signal and at least one second transmitting unit operated according to a clock signal generated independently from the master clock signal, the time of the second transmitting unit being compensated according to time information from the first transmitting unit, wherein the first transmitting unit comprises:

first time counting means for counting time according to a master clock signal;

command sending means for sending a communication time count command to the second transmitting unit so as to count communication time between the first transmitting unit and the second transmitting unit;

receiving means for receiving a reply to the communication time count command from the second transmitting unit;

communication time calculating means for calculating inter-transmitting-unit communication time necessary for communication between the first transmitting unit and the second transmitting unit according to the time that is from when the first transmitting unit sends the communication time count command until the first transmitting unit receives the reply from the second transmitting unit, and a predetermined time that is from when the second transmitting unit receives the communication time count command until the second transmitting unit sends the reply; and notifying means for notifying the second transmitting unit of the inter-transmitting-unit communication time calculated by said communication time calculating means and the time information counted by said first time counting means, and wherein the second transmitting unit whose time is to be compensated comprises:

second time counting means for counting time according to the clock signal generated independently from the master clock signal;

reply sending means for sending the reply after a predetermined time elapses from when the second transmitting unit receives the communication time count command from the first transmitting unit; and time compensating means for compensating the time counted by said second time counting means according to the inter-transmitting-unit communication time and the time information received from the first transmitting unit.

7. The transmitting unit as set forth in claim 6, wherein said reply sending means includes a timer and is adapted for starting the timer when receiving the communication time count command and for sending the reply to the communication time count command when the count time of the timer becomes a predetermined time-out value.

8. The transmitting unit as set forth in claim 7, wherein said communication time calculating means includes a timer and is adapted for starting the timer when sending the communication time count command, and for stopping the timer when receiving the reply to the communication time count command, so as to count time that is from sending the communication time count command until receiving the reply.

9. A transmitting system having a first transmitting unit operated according to a master clock signal and at least one second transmitting unit operated according to a clock signal generated independently from the master clock signal, the time of the second transmitting unit being compensated according to time information from the first transmitting unit, wherein the first transmitting unit comprises:

first time counting means for counting time according to the master clock signal;

command sending means for sending a communication time count command to the second transmitting unit so as to count the communication time between the first transmitting unit and the second transmitting unit at predetermined intervals;

receiving means for receiving a reply to the communication time count command from the second transmitting unit;

communication time calculating means for calculating inter-transmitting-unit communication time necessary for communication between the first transmitting unit and the second transmitting unit, according to the time that is from when the first transmitting unit sends the communication time count command until the first transmitting unit receives the reply from the second transmitting unit, and a predetermined time that is from when the second transmitting unit receives the communication time count command until the second transmitting unit sends the reply;

notifying means for notifying the second transmitting unit of the inter-transmitting-unit communication time calculated by said communication time calculating means; and time information notifying means for notifying the second transmitting unit of the time information counted by said first time counting means, and wherein the second transmitting unit whose time is to be compensated comprises:

second time counting means for counting time according to a clock signal generated independently from the master clock signal;

reply sending means for sending the reply after a predetermined time elapses from when the second transmitting unit receives the communication time count command from the first transmitting unit; and time compensating means for compensating the time counted by said second time counting means according to the time information and the inter-transmitting-unit communication time received from the first transmitting unit at the predetermined intervals.

10. A transmitting system having a first transmitting unit operated according to a master clock signal and at least one second transmitting unit operated according to a clock signal generated independently from the master clock signal, the time of the second transmitting unit being compensated according to time information from the first transmitting unit, wherein the first transmitting unit comprises:

first time counting means for counting time according to the master clock signal;

reply sending means for sending a reply after predetermined time elapses from when the first transmitting unit receives a communication time count command from the second transmitting unit; and time information notifying means for notifying the second transmitting unit of time information counted by said first time counting means when the first transmitting unit receives a time information request command from the second transmitting unit, and wherein the second transmitting unit whose time is to be compensated comprises:

second time counting means for counting time according to the clock signal generated independently from the master clock signal;

communication time counting command sending means for sending an inter-transmitting-unit communication time count command to the first transmitting unit so as to count the time necessary for communication between the first transmitting unit and the second transmitting unit;

time information request command sending means for sending the time information request command to the first transmitting unit so as to request the first transmitting unit to send the time information;

receiving means for receiving the reply to the communication time count command from the first transmitting unit and the time information according to the time information request command;

communication time-calculating means for calculating inter-transmitting-unit communication time necessary for communication between the first transmitting unit and the second transmitting unit, according to the time that is from when the second transmitting unit sends the communication time count command until the second transmitting unit receives the reply from the first transmitting unit, and a predetermined time that is from when the first transmitting unit receives the communication time count command until the first transmitting unit sends the reply; and time compensating means for compensating the time counted by said second time counting means according to the inter-transmitting-unit communication time calculated by said communication time calculating means and the time information received from the first transmitting unit.

11. A time compensating method for a transmitting unit having a local CPU operated according to a master clock signal and a remote CPU operated according to a clock signal generated independently from the master clock signal, the time of the remote CPU being compensated according to time information from the local CPU, comprising the steps of:

sending a communication time count command to a remote CPU so as to count inter-CPU communication time;

calculating inter-CPU communication time necessary for communication between CPUs according to the time that is from when the local CPU sends the communication time count command until the local CPU receives a reply from the remote CPU, and a predetermined time that is from when the remote CPU receives the communication time count command until the remote CPU sends the reply; and compensating the time counted by the remote CPU to be compensated according to the inter-CPU communication time and the time information from the local CPU.

12. A time compensating method for a transmitting system having a local transmitting unit operated according to a master clock signal and at least one remote transmitting unit operated according to a clock signal generated independently from the master clock signal, the time of the remote transmitting unit being compensated according to the time information from the local transmitting unit, comprising the steps of:

sending a communication time count command so as to count inter-transmitting-unit communication time;

calculating inter-transmitting-unit communication time necessary for communication between the transmitting units with time to be compensated according to time that is from when a local transmitting unit sends the communication time count command until the local transmitting unit receives a reply from the remote transmitting unit, and a predetermined time that is from when the remote transmitting unit receives the communication time count command until the remote transmitting unit sends the reply; and compensating the time counted by a remote transmitting unit whose time is to be compensated, according to the inter-transmitting-unit communication time and time information from the local transmitting unit.

* * * * *